No. 687,095. Patented Nov. 19, 1901.
H. WICKS.
CANE CARRIER AND FEEDER.
(Application filed Apr. 5, 1901.)
(No Model.)
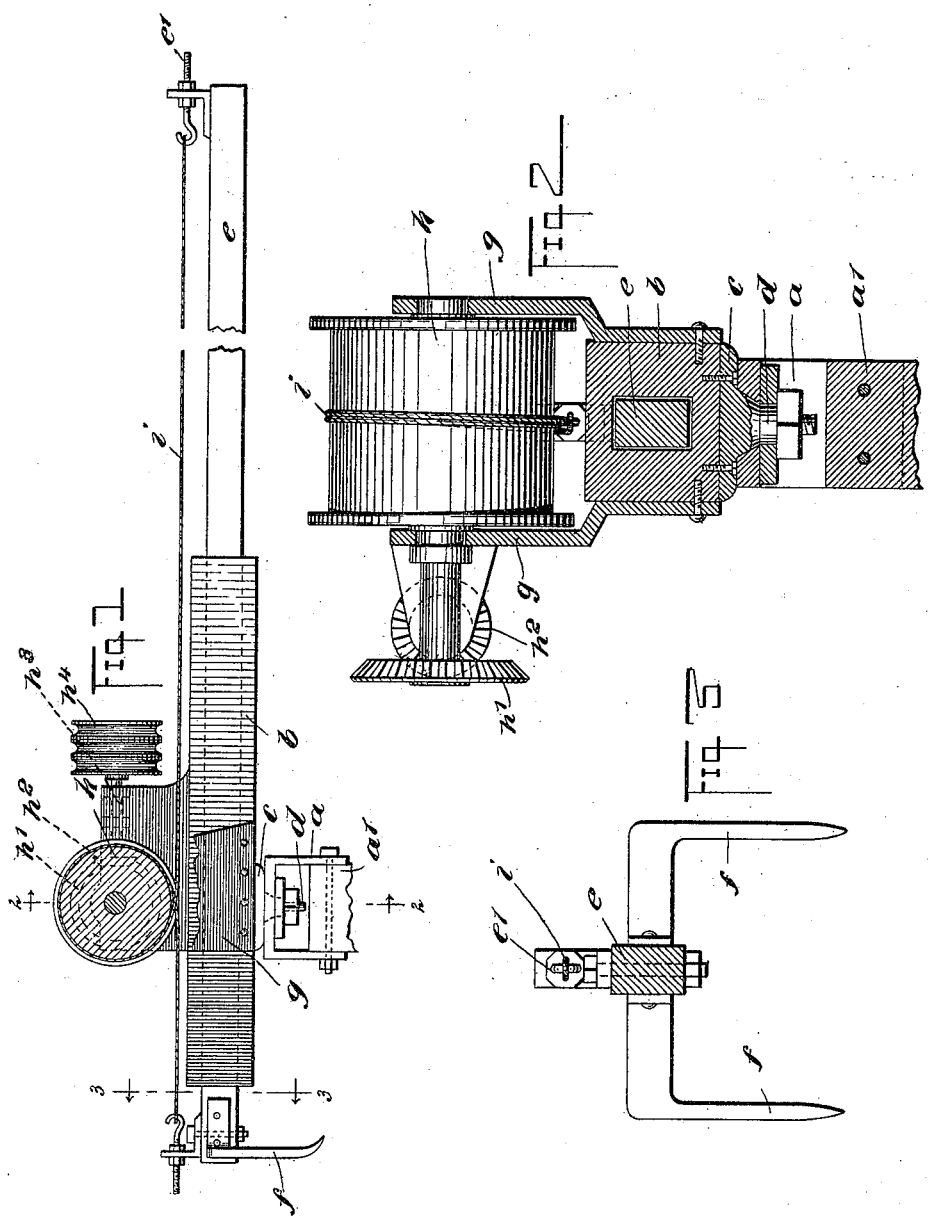
WITNESSES:
INVENTOR
Harry Wicks
BY
ATTORNEYS

UNITED STATES PATENT OFFICE.

HARRY WICKS, OF ISLAND OF HAWAII, TERRITORY OF HAWAII.

CANE CARRIER AND FEEDER.

SPECIFICATION forming part of Letters Patent No. 687,095, dated November 19, 1901.

Application filed April 5, 1901. Serial No. 54,558. (No model.)

*To all whom it may concern:*

Be it known that I, HARRY WICKS, a citizen of the British Empire, and a resident of the Island of Hawaii, Territory of Hawaii, have invented a new and Improved Cane Carrier and Feeder, of which the following is a full, clear, and exact description.

The invention relates to an apparatus for handling sugar-cane, and especially useful for drawing the cane into the carrier, which in turn delivers the cane to the rolls of the sugar-mill.

The device comprises a swiveled body portion in which a bar is mounted to reciprocate, the bar carrying a hook or hooks to engage the cane and drag it from one point to another.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a side view of the feeder with parts broken away. Fig. 2 is an enlarged cross-section on the line 2 2 of Fig. 1, and Fig. 3 is an enlarged sectional elevation on the line 3 3 of Fig. 1.

$a$ represents a support, which is here shown to be in the form of an inverted-U iron bolted to a post $a'$. A body consisting of a sleeve $b$ is bolted to a plate $c$, carrying a stud $d$, fitted to turn loosely in the support $a$. Fitted to slide longitudinally in the sleeve $b$ is the bar $e$, which carries at its front end two hooks $f$, the shanks of which project out laterally, so that the bills or points of the hooks will be removed from each other. Fastened to the side of the sleeve $b$ are cheek-pieces $g$, which project upward above the sleeve and carry a drum $h$. On this drum is wound several times a cable $i$ of any sort, the ends of which are fastened to the bar $e$ by hooks $e'$, adjustably connected thereto, so that the tension of the cable may be regulated. For turning the drum $h$ a miter-gear $h'$ is fastened to the axle of the drum and is meshed with a similar gear $h^2$ on a shaft $h^3$, mounted to turn on one of the cheek-pieces $g$. This shaft $h^3$ carries a pulley $h^4$, adapted to work with a power-transmitting belt driven from any desired source. The pulley $h^4$ is here shown as adapted to rope transmission; but any form of pulley may of course be used instead.

By turning the drum $h$ in one direction or the other the bar may be moved backward or forward, and by engaging the hooks $f$ with the cane the latter may be moved about as desired. The whole apparatus may be turned on its pivot or swivel, so that cane in various positions may be reached.

Having thus described my invention, I claim as new and desire to secure by Letters Patent—

1. A cane-feeder, having a bar with means for mounting and operating the same, and two hooks attached to the ends of the bar and having their shanks projected outward oppositely from each other to separate the points or bills of the hooks.

2. In a cane carrier and feeder, the combination of a body mounted to turn and comprising a horizontally-disposed sleeve, a bar fitted to slide in the sleeve, means attached to the bar for engaging the cane, and means for operating the bar.

3. In a cane carrier and feeder, the combination of a body, a bar slidably carried thereby, means attached to the bar to engage the cane, a drum mounted on the body, and a cable the ends of which are attached to the ends of the bar, the cable being wound around the drum.

In testimony whereof I have signed my name to this specification in the presence of two subscribing witnesses.

HARRY WICKS.

Witnesses:
E. E. BOMKE,
J. W. LEONHART.